(12) United States Patent
Singh et al.

(10) Patent No.: US 7,869,390 B2
(45) Date of Patent: Jan. 11, 2011

(54) METHOD AND SYSTEM FOR POWER SAVE MULTI-POLL (PSMP) COMMUNICATION IN WIRELESS SYSTEMS

(75) Inventors: Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 810 days.

(21) Appl. No.: 11/598,977

(22) Filed: Nov. 13, 2006

(65) Prior Publication Data
US 2007/0159982 A1  Jul. 12, 2007

Related U.S. Application Data

(60) Provisional application No. 60/756,021, filed on Jan. 3, 2006.

(51) Int. Cl.
G08C 17/00 (2006.01)
(52) U.S. Cl. .................. 370/311; 370/252; 370/329; 370/345; 370/347; 370/349; 370/468; 370/498; 455/343.2; 455/343.4
(58) Field of Classification Search .................. None
See application file for complete search history.

(56) References Cited

U.S. PATENT DOCUMENTS

| | | | |
|---|---|---|---|
| 5,596,315 A | 1/1997 | Olds et al. | |
| 7,116,983 B2 | 10/2006 | Lan et al. | |
| 7,231,530 B1 | 6/2007 | Miller et al. | |
| 7,245,946 B2 | 7/2007 | Liu | |
| 7,433,329 B2 | 10/2008 | Qian | |
| 7,457,973 B2 | 11/2008 | Liu | |
| 7,477,616 B2 | 1/2009 | Wang et al. | |
| 7,710,939 B2 | 5/2010 | Shao et al. | |
| 2004/0047351 A1 | 3/2004 | Del Prado Pavon et al. | |
| 2005/0025080 A1 | 2/2005 | Liu | |

(Continued)

OTHER PUBLICATIONS

Mujtaba, S. A. et al., "TGn Sync Proposal Technical Specification," IEEE 802.11-04-0889r7, Jul. 2005, pp. 1-133.

(Continued)

*Primary Examiner*—Vincent P Harper
*Assistant Examiner*—Mazda Sabouri
(74) *Attorney, Agent, or Firm*—Kenneth L. Sherman, Esq.; Michael Zarrabian, Esq.; Myers Andras Sherman & Zarrabian LLP (57) ABSTRACT

The present invention provides a method and a system for PSMP communication in a wireless communication system such as an IEEE 802.11n WLAN including an AP and multiple STAs. An example of such a PSMP communication involves transmitting a PSMP frame from the AP to the STAs over a wireless channel, detecting if the channel is idle for certain duration, and if the channel is idle for said certain duration, then performing a PSMP recovery process. The PSMP frame includes one or more STA info fields which specify schedules of periods for communication over the wireless channel in a PSMP sequence. In performing a PSMP recovery process, the AP constructs and broadcasts a PSMP recovery frame that allows STAs that missed the original PSMP frame to join the PSMP sequence.

49 Claims, 8 Drawing Sheets

U.S. PATENT DOCUMENTS

| | | | |
|---|---|---|---|
| 2005/0047357 A1* | 3/2005 | Benveniste | 370/311 |
| 2006/0045035 A1 | 3/2006 | Liu | |
| 2006/0087996 A1 | 4/2006 | Stephens | |
| 2006/0285517 A1* | 12/2006 | Kakani | 370/329 |
| 2007/0037548 A1* | 2/2007 | Sammour et al. | 455/343.2 |
| 2007/0147284 A1 | 6/2007 | Sammour et al. | |
| 2008/0181156 A1 | 7/2008 | Ecclesine | |
| 2008/0232287 A1 | 9/2008 | Shao et al. | |

OTHER PUBLICATIONS

IEEE Std. 802.11a-1999, adopted and redesignated as ISO/IEC 8802-11:1999/Amd 1: 2000 (E), 2000, pp. 1-91.

IEEE P802.11e/D13.0 (Jan. 2005), "Amendment: Medium Access Control (MAC) Quality of Service (QoS) Enhancements," pp. 1-198.

IEEE Wireless LAN Edition (2003), "A compilation based on IEEE Std 802.11TM—1999 (R2003) and its amendments," pp. 1-706.

Van Veen, BD.; Buckley, K.M., "Beamforming: a versatile approach to spatial filtering," ASSP Magazine, IEEE, vol. 5, Iss. 2, Apr., 1988, pp. 4-24.

Kose, C., and Edwards, B., "IEEE P802.11, Wireless LANs, WWiSE Proposal: High throughput extension to the 802.11 Standard," doc: IEEE 802.11-05-0149r2, Mar. 2005, 93 pages.

Adrian Stephens and Sean Coffey, "Joint Proposal: High Throughput Extension to the 802.11 Standard: MAC," 11-05-1095-02-000n-joint-proposal-mac-specifications, Nov. 2005.

"Amendment: Wireless LAN MAC and PHY specifications: Enhancement for Higher Throughputs," IEEE P802.11n/D1.0, Mar. 2006.

U.S. Non-final Office Action mailed Sep. 8, 2009 for U.S. Appl. No. 11/703,405.

U.S. Non-final Office Action for U.S. Appl. No. 11/726,260 mailed Dec. 28, 2009.

U.S. Notice of Allowance for U.S. Appl. No. 11/703,405 mailed Dec. 30, 2009.

* cited by examiner

PSMP sequence without PSMP recovery

FIG. 4A
Prior Art

PSMP sequence with PSMP recovery

PSMP sequence with PSMP recovery
FIG. 5B

PSMP sequence without PSMP recovery

FIG. 7A
Prior Art

PSMP sequence with PSMP recovery

METHOD AND SYSTEM FOR POWER SAVE MULTI-POLL (PSMP) COMMUNICATION IN WIRELESS SYSTEMS

RELATED APPLICATION

This application claims the benefit of U.S. Provisional Patent Application Ser. No. 60/756,021, filed on Jan. 3, 2006, incorporated herein by reference.

FIELD OF THE INVENTION

The present invention relates to wireless communications and in particular, to reliable PSMP communications in wireless communication systems.

BACKGROUND OF THE INVENTION

In frame transmissions between devices in a wireless communication system that implements power saving, a power saving sequence begins with the transmission of an unaggregated power save frame, and terminates when the last scheduled uplink (UL) transmission ends.

An example of such a wireless communication system is IEEE 802.11n. The IEEE 802.11 Task Group n (TGn) provides a high data rate wireless local area network (WLAN) standard which allows a maximum throughput of at least 130 Mbps. A typical IEEE 802.11n WLAN includes an access point (AP) and at least one station (STA). An amended TGn draft specification (IEEE P802.11n/D1.0 (March 2006), "Amendment: Wireless LAN MAC and PHY specifications: Enhancement for Higher Throughputs"), incorporated herein by reference, provides a power management scheme termed PSMP. In frame transmissions between an AP and a STA in an IEEE 802.11n WLAN that implements PSMP, a PSMP sequence begins with the transmission of an unaggregated PSMP frame, and terminates when the last scheduled uplink (UL) transmission ends.

Figure 1:
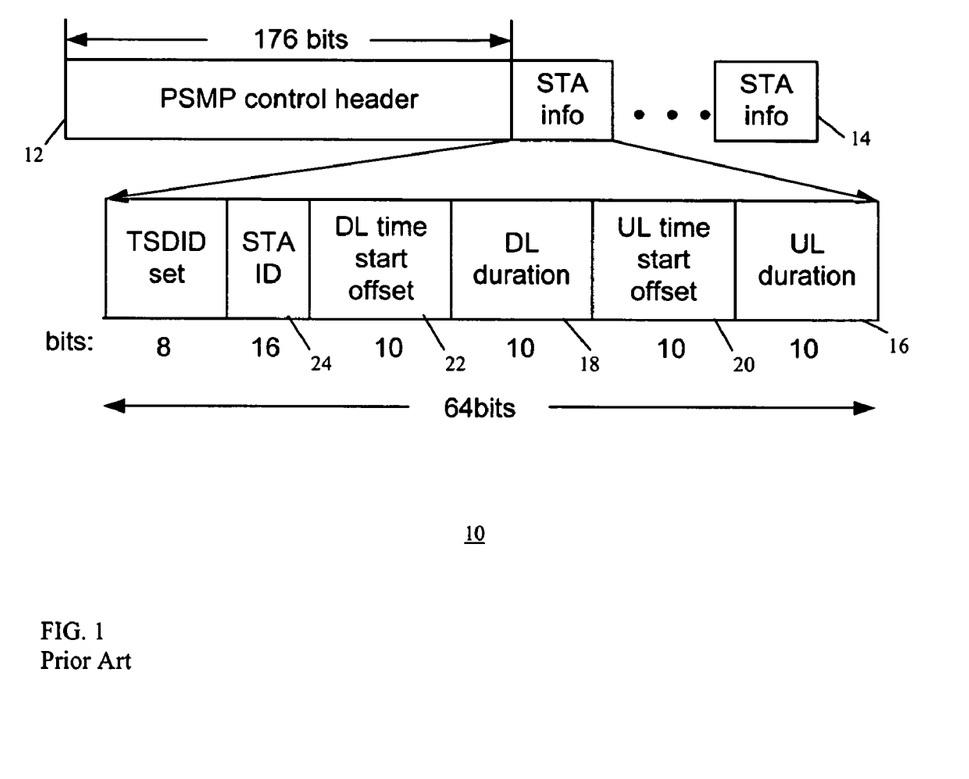
FIG. 1 shows a conventional PSMP frame.

As shown in FIG. 1, such a PSMP frame 10 comprises a PSMP control header 12 and one or more STA information (STA info) fields 14. Each STA info field 14 carries timing details 16 of scheduled UL periods and timing details 18 of scheduled downlink (DL) periods. Each STA info field 14 also includes sub-fields 20 and 22 for UL and DL start time offsets, respectively, which help in determining the exact time when the UL and DL periods start. Each STA info field 14 further includes the STA identification (STA ID) field 24 that identifies a corresponding STA that the STA info field 14 is intended for. Based on the information in each STA info field 14, the STA that is identified in the STA ID field 24 can determine exactly when to sleep and when to wake up for data communications (i.e., data transmission/reception).

Figure 2:
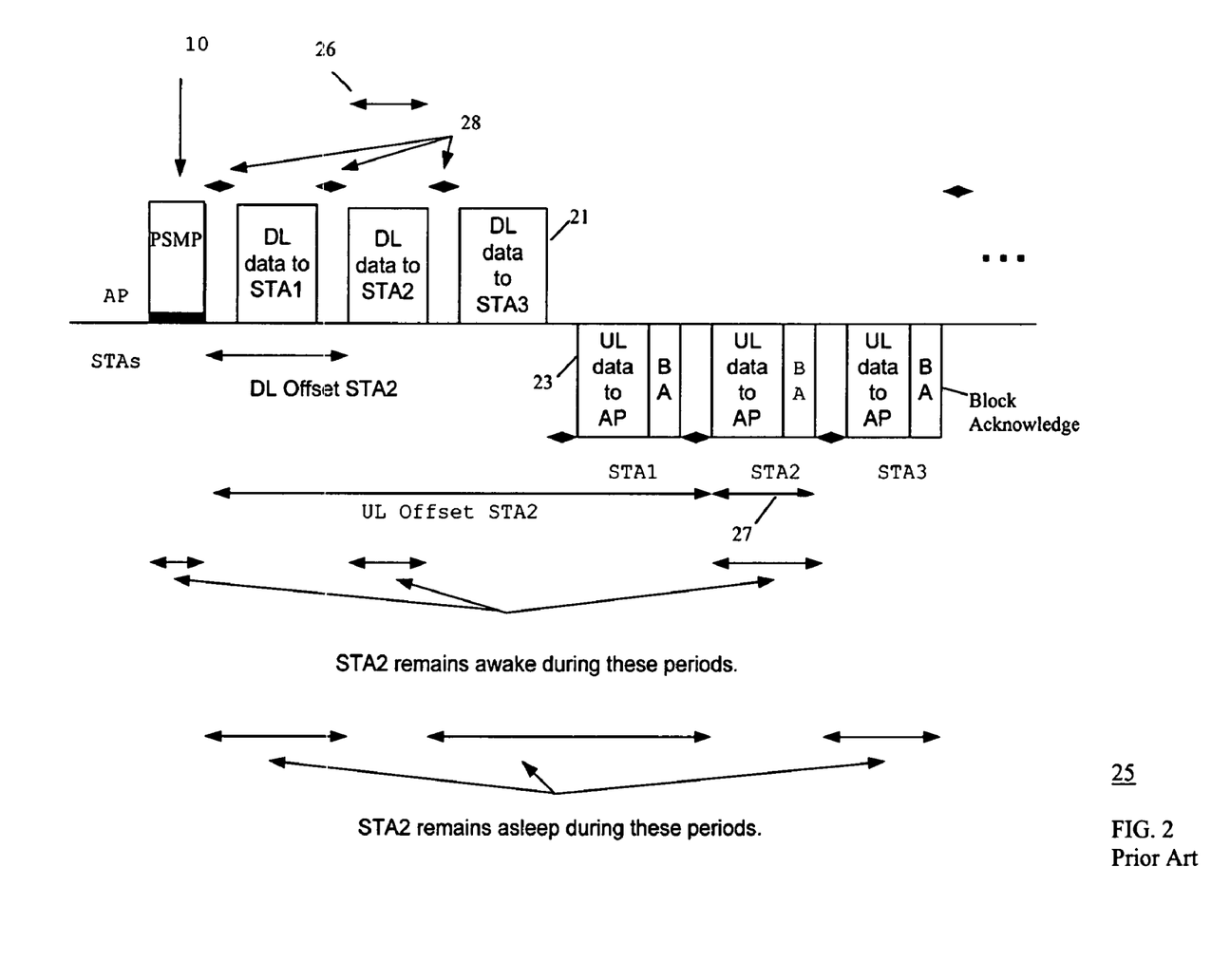
FIG. 2 shows a conventional PSMP communication sequence.

FIG. 2 shows a typical PSMP communication sequence 25 for a WLAN with an AP and multiple stations (e.g., STA1, STA2 and STA3). The PSMP frame 10 includes STA info fields 14 for the stations STA1, STA2 and STA3. The STA info fields 14 indicate the scheduled durations for the DL periods 26 (for communicating the DL data packets 21 to the STAs), and the UL periods 27 (for communicating the UL data packets 23 to the AP), for each of the stations, STA1, STA2 and STA3. The DL periods 26 are separated by intervals 28 (e.g., short interframe space (SIFS) intervals and/or reduced interframe space (RIFS) intervals). Similarly, the UL periods 27 are separated by the intervals 28.

In one example, multiple streams such as MP3 audio, email, chat, VOIP, etc., are aggregated for a single STA in a PSMP sequence. The PSMP control header 12 further includes a specialized PSMP field which: (1) when set to 1, indicates whether the PSMP sequence is followed immediately by another PSMP sequence, and (2) when set to 0, indicates that the current PSMP sequence is the last in the current service period.

The Medium Access Control Protocol Data Unit (MPDU) for a PSMP frame is a broadcast/multicast packet. As a result, it is highly likely that such a packet can collide with other simultaneous transmissions. Conventional approaches suitable for protecting unicast packets are not effective in protecting the PSMP frame against collisions. For example, an RTS/CTS exchange has conventionally been used to protect unicast packet delivery. However, this is not suitable for broadcast/multicast packet such as the PSMP frame.

Another conventional approach is to transmit the PSMP MPDU at a base rate. Yet another conventional approach is to precede the transmission of the PSMP MPDU by a CTS (i.e., CTS-to-self) frame with the receiver address (RA) field set to the initiator's (e.g., the AP's) own media access control (MAC) address. However, neither approach can fully protect the PSMP frame. Therefore, it is quite possible that the PSMP frame is not correctly received by one or more PSMP-enabled STAs in a PSMP sequence. As such, there is a need for a reliable PSMP frame transmission approach in broadcast/multicast wireless applications.

BRIEF SUMMARY OF THE INVENTION

The present invention provides a method and a system for reliable PSMP communication in a wireless communication system such as an IEEE 802.11n WLAN including an AP and multiple STAs. An embodiment of such a PSMP communication involves transmitting a PSMP frame from the AP to the STAs over a wireless channel, detecting if the channel is idle for certain duration, and if the channel is idle for said certain duration, then performing a PSMP recovery process. The PSMP frame includes one or more STA info fields which specify schedules of periods for communication over the wireless channel in a PSMP sequence.

In performing a PSMP recovery process, the AP takes control of the channel whenever the channel is idle for said certain duration in relation to a scheduled communication period specified in the PSMP frame. The AP then constructs, and broadcasts, a PSMP recovery frame that allows STAs that missed the original PSMP frame to join the PSMP sequence.

In one example, the PSMP recovery frame includes a modified STA info field for a STA scheduled in a current ULT period. The PSMP recovery frame can further include one or more unmodified STA info fields corresponding to one or more other STAs with ULT periods originally scheduled later in the PSMP sequence than the current ULT period.

In accordance with further embodiments of the present invention, the AP further adjusts the starting offsets of ULT and DLT periods in the STA info field for the selected STA in the PSMP recovery frame, relative to the duration of the PSMP recovery frame transmission. An STA that missed the PSMP frame can join the scheduled PSMP sequence based on a corresponding schedule in the PSMP recovery frame. The STA then follows wake and sleep cycles according to that schedule. This enables the STAs to conserve power and channel bandwidth during sleep cycles. In addition, since the STA joins the PSMP sequence, the wireless channel remains busy and the probability of some STAs misinterpreting the channel as idle (and transmitting out of schedule) is reduced. The PSMP recovery frame also allows transmission of QoS sensitive data to meet strict presentation time deadlines.

These and other features, aspects and advantages of the present invention will become understood with reference to the following description, appended claims and accompanying figures.

BRIEF DESCRIPTION OF THE DRAWINGS

In the drawings, like references refer to similar elements.

DETAILED DESCRIPTION OF THE INVENTION

The present invention provides a method and a system for reliable PSMP communications in a wireless communication system such as an IEEE 802.11n WLAN including an AP and multiple STAs. In one embodiment of the present invention, a PSMP recovery mechanism (process) is implemented whereby the AP gains control of the wireless channel whenever the channel remains idle for a specified period (i.e., point coordination function interframe space (PIFS) interval), from the start of an UL transmission (ULT) period.

Accordingly, after transmitting a PSMP frame in a PSMP sequence, the AP transmits a PSMP recovery frame to a STA over the wireless channel if a currently scheduled ULT period (i.e., ULT duration) is longer than the total duration of the PSMP recovery frame transmission and the PIFS period (i.e., PIFS interval or PIFS duration). The PSMP recovery frame modifies the schedule of the STA in the current ULT period, while the schedule of the other STAs remains unchanged.

In another embodiment, the PSMP recovery frame is transmitted after a PIFS period has passed the previous Up Link or Down Link transmission. This does not change the PSMP recovery mechanism, and only affects the timing instant when the PSMP recovery frame is invoked, as described further below.

The PSMP recovery frame is a type of a PSMP frame, and further includes: (a) a modified STA info field for the STA that is scheduled in the current ULT (and/or DLT) schedule, by adjusting the time remaining after the PIFS period and the PSMP recovery frame transmission, and (b) unmodified STA info fields for ULTs of the other STAs originally scheduled after the current ULT in the PSMP sequence. The ULT (and/or DLT) start offset is specified relative to the end of the PSMP recovery frame to compensate for the elapsed time since transmission of the PSMP frame.

One benefit of such a PSMP recovery frame is to provide those STAs that did not correctly receive the original PSMP frame, with another opportunity to correctly follow schedules for sleeping and data communication.

As noted, the PSMP recovery frame includes unmodified ULTs for those STAs that were originally scheduled after the current ULT in the PSMP sequence. If those STAs correctly received the original PSMP frame, this indicates that those STAs are asleep, since STAs wake up during their scheduled ULT periods and DLT periods only and cannot receive the PSMP recovery frame. However, if some STAs missed the original PSMP frame, then such STAs may receive the PSMP recovery frame and successfully follow the ULT and DLT schedules therein. Therefore, only the ULT (and/or DLT) start offset of the STA scheduled for the current ULT in the PSMP sequence is modified to compensate for the elapsed time.

Those STAs that do not correctly receive the original PSMP frame remain awake during the entire PSMP sequence. Such STAs cannot transmit UL data in assigned ULT periods, and the wireless channel remains idle. The PSMP recovery frame reduces the possibility of such STAs mistakenly transmitting over the idle channel, thereby reducing the probability of collisions with other DL and UL data transmissions over the channel.

Figure 3:
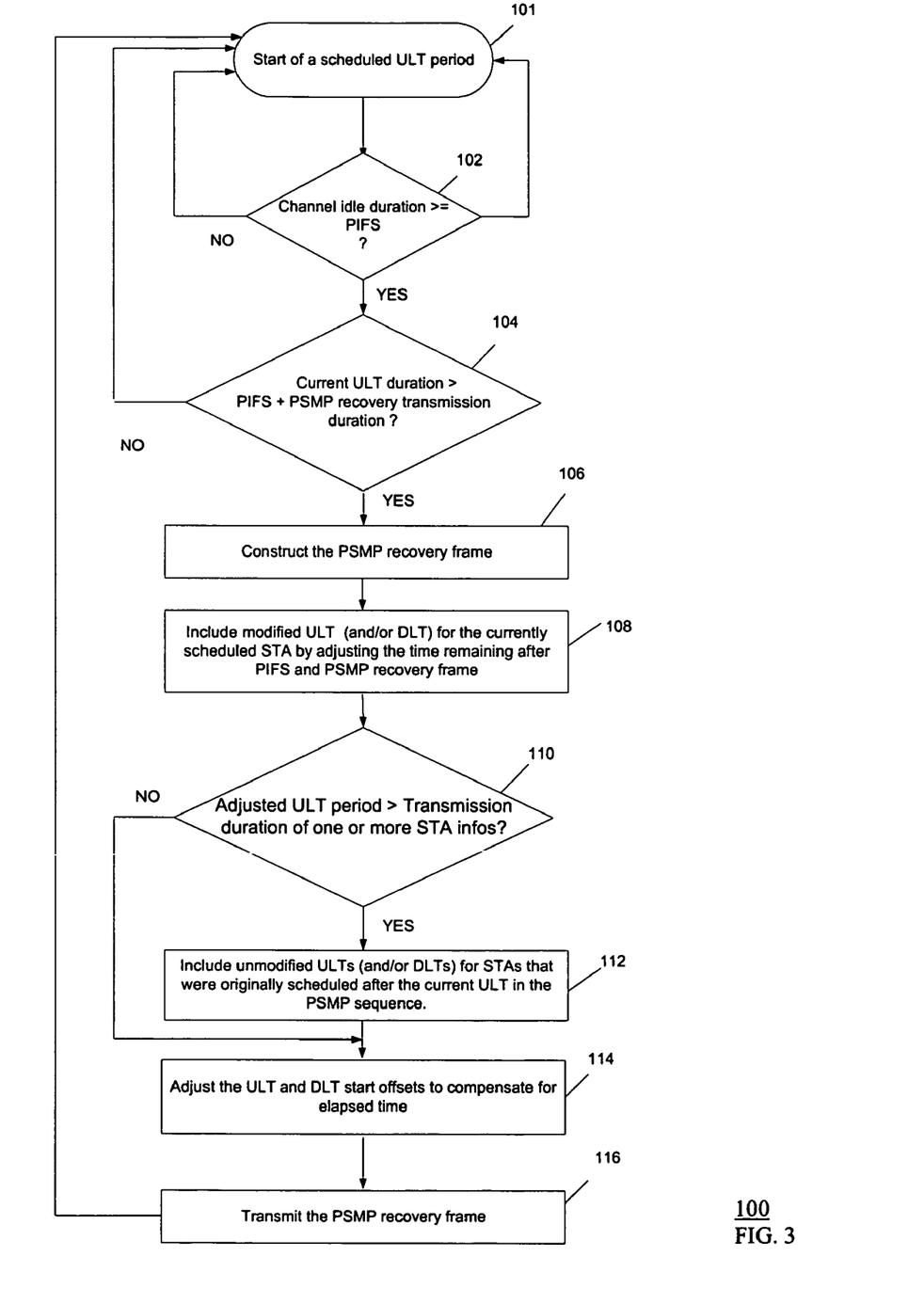
FIG. 3 shows a flowchart of the steps of the PSMP recovery mechanism, according to an embodiment of the present invention.

After transmitting the PSMP frame 10 (FIG. 2) to the STAs, the AP waits to receive UL data packets 23 from the STAs during scheduled ULT periods 27. After transmission of the PSMP frame, a PSMP recovery mechanism is invoked according to the present invention. FIG. 3 shows a flowchart 100 of the process of such a PSMP recovery mechanism, including the steps of:

Step 101: Start of a new scheduled ULT period.

Step 102: The AP determines if PSMP recovery needs to be invoked by determining if the channel idle duration>=PIFS period. The AP performs a clear channel assessment (CCA) to determine if there is activity on the channel. If the channel remains idle for a PIFS period (i.e., no activity on the channel), then the process proceeds to step 104, otherwise the process proceeds to step 101.

Step 104: In order to determine if the current ULT period is sufficient for transmitting the PSMP recovery frame, the AP determines if the current ULT period is longer than the PIFS period plus the PSMP recovery frame transmission duration (including one STA info field for the currently scheduled STA). If not, then it is not possible to transmit the PSMP recovery frame, and the process proceeds to step 101. Otherwise, the process proceeds to step 106.

Step 106: The AP constructs the PSMP recovery frame.

Step 108: The AP includes a modified STA info field in the PSMP recovery frame for the currently scheduled STA. Specifically, the ULT (and/or DLT) field(s) of the STA info field is modified for the STA scheduled in the current ULT period by adjusting the time remaining after the PIFS period and the PSMP recovery frame transmission duration.

Step 110: The AP determines if the adjusted ULT period is long enough to include one or more STA infos in the PSMP recovery frame. This step checks if the adjusted ULT period is sufficient to include the STA info fields for the other STAs that were originally scheduled after the current ULT in the PSMP sequence, in the PSMP recovery frame for transmission. If the ULT (and/or DLT) data for the currently scheduled STA is time critical, then the STA info fields for the other STAs are not included in the PSMP recovery frame. If the ULT period is not sufficient, then the process proceeds to step 114. Otherwise, the process proceeds to step 112.

Step 112: The AP includes unmodified STA info fields in the PSMP recovery frame for the STAs that were originally scheduled, as determined in step 110. The ULT (and/or DLT) field(s) of the STA info fields for these STAs is unchanged.

Step 114: To compensate for the time elapsed since transmission of the PSMP frame, the AP adjusts the ULT and DLT start offsets fields 20 and 22, respectively, for all STA info fields included in the PSMP recovery frame, based on the time remaining for transmission of the PSMP recovery frame.

Step 116: The AP transmits the PSMP recovery frame as a broadcast/multicast frame, and proceeds back to step 101.

Upon receiving the PSMP recovery frame, all PSMP-enabled STAs which did not receive the original PSMP frame, can determine their respective UL and DL transmission schedules from the PSMP recovery frame, and successfully join the current PSMP sequence. Further, all PSMP-enabled STAs start following wake and sleep cycles (schedules), which enable the STAs to conserve energy during sleep cycles. In addition, since the STAs join the scheduled PSMP sequence, the wireless channel remains busy and the probability of some STAs misinterpreting the channel as idle (and transmitting out of schedule) is reduced. The PSMP recovery frame also allows transmission of QoS sensitive data to meet strict presentation time deadlines. Accordingly, reliability of PSMP communication sequences in IEEE 802.11n wireless communications is enhanced.

Figure 4A:
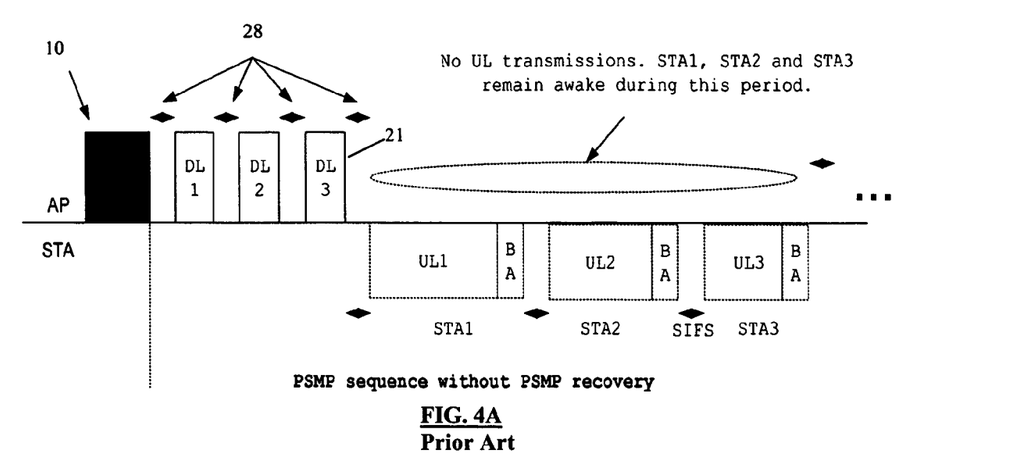
FIGS. 4-7 show comparisons of conventional PSMP sequences and PSMP sequences with PSMP-recovery, according to the present invention.
Figure 4B:
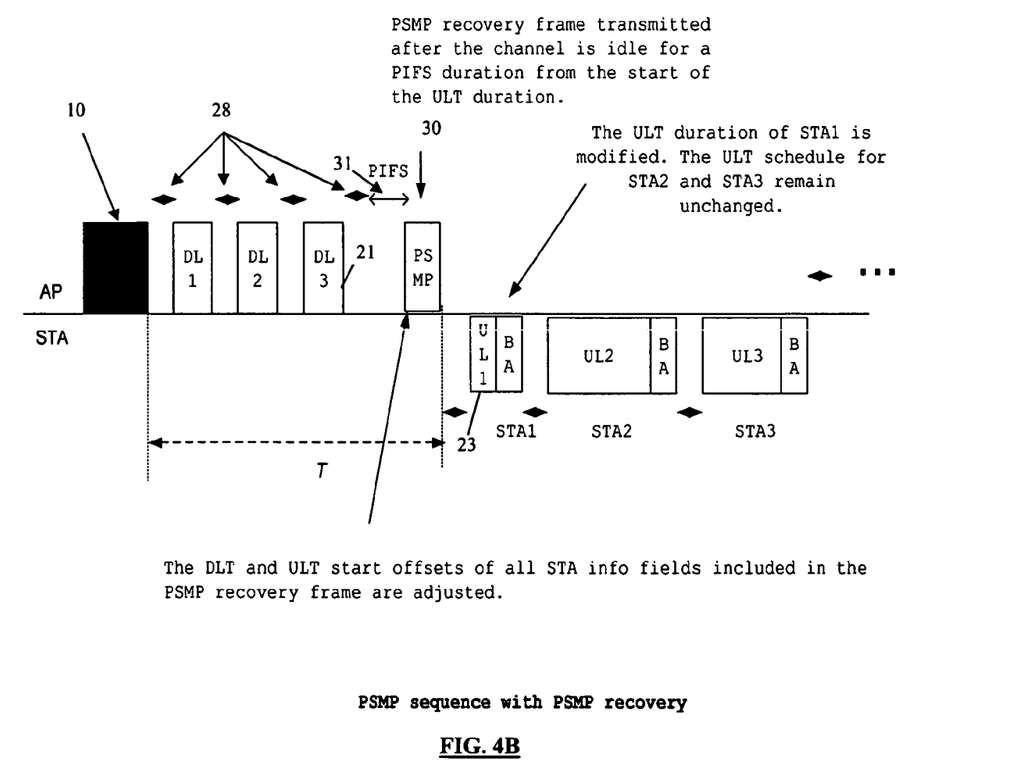

Several example data communication scenarios between an AP and multiple STAs in a WLAN which implements the PSMP recovery scheme according to an embodiment of the present invention are now described. FIGS. 4A-B show an example comparison of: (1) data communication using a conventional PSMP sequence (FIG. 4A), and (2) data communication using a PSMP sequence that implements a PSMP recovery scheme according to the present invention (FIG. 4B), respectively. In both PSMP sequences, the AP initially transmits a PSMP frame 10, but none of the STAs receive the PSMP frame 10.

The PSMP frame 10 carries an STA info field for each STA. The STA info field provides UL and DL transmission schedules for that STA. Since the STAs (STA1, STA2 and STA3) did not receive the PSMP frame, the STAs do not know when to perform the UL transmissions. As a result, in the PSMP sequence in FIG. 4A, no UL transmissions are performed by the STAs and the STAs remain awake for the entire PSMP sequence duration. This prevents conservation of power and wireless channel bandwidth. Moreover, time-critical data will miss presentation deadlines.

In the PSMP sequence in FIG. 4B, after transmitting the PSMP frame 10, the AP transmits a PSMP recovery frame 30 according to the process steps in FIG. 3. Specifically, after transmitting the PSMP frame 10 (FIG. 4B), the AP detects that the channel is idle for a PIFS period from the beginning of the scheduled UL transmission for STA1. Thereafter, the AP checks if the ULT period of the STA scheduled in the current ULT period (e.g., STA1), is sufficient to transmit the PSMP recovery frame 30 including the STA info fields for STA1 and other STAs that were originally scheduled after STA1. If the ULT period is sufficient, then the AP includes a modified ULT period for STA1, and an unmodified ULT periods for STA2 and STA3 in the PSMP recovery frame 30. Thus, the PSMP recovery frame 30 includes STA info fields for STA1, STA2, and STA3.

Further, the ULT start offset of the STA info fields included in the PSMP recovery frame is adjusted. Specifically, the DLT and ULT start offsets of all STA info fields included in the PSMP recovery frame 30 are adjusted based on the time elapsed from the end of the PSMP frame 10 to the end of the PSMP recovery frame 30. In the example of FIG. 4B, the DLT and ULT start offsets are adjusted by the time period T to the end of the PSMP recovery frame transmission, as shown in FIG. 4B.

Upon receiving the PSMP recovery frame 30, STA1, STA2 and STA3 start following the UL transmission schedules specified in the PSMP recovery frame 30. Note that STA2 and STA3 transmit UL data in their scheduled UL periods. This is the same as if the original PSMP frame 10 had been received by STA2 and STA3. However, the ULT period for STA1 is shortened by a PIFS plus PSMP recovery transmission duration. Further, as a result of receiving the ULT schedules in the PSMP recovery frame 30, the STAs (STA1, STA2 and STA3) remain awake only for their scheduled ULT periods, and otherwise sleep. This conserves power and channel bandwidth.

Figure 5A:
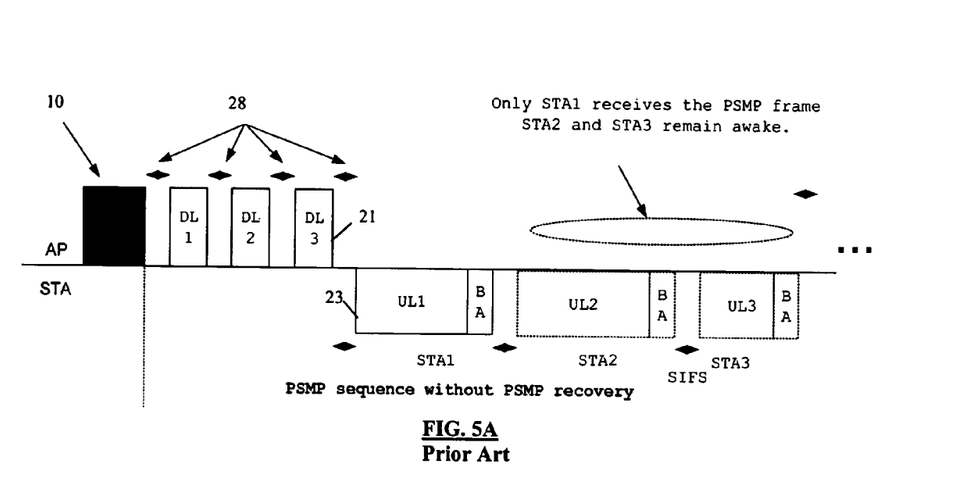
Figure 5B:
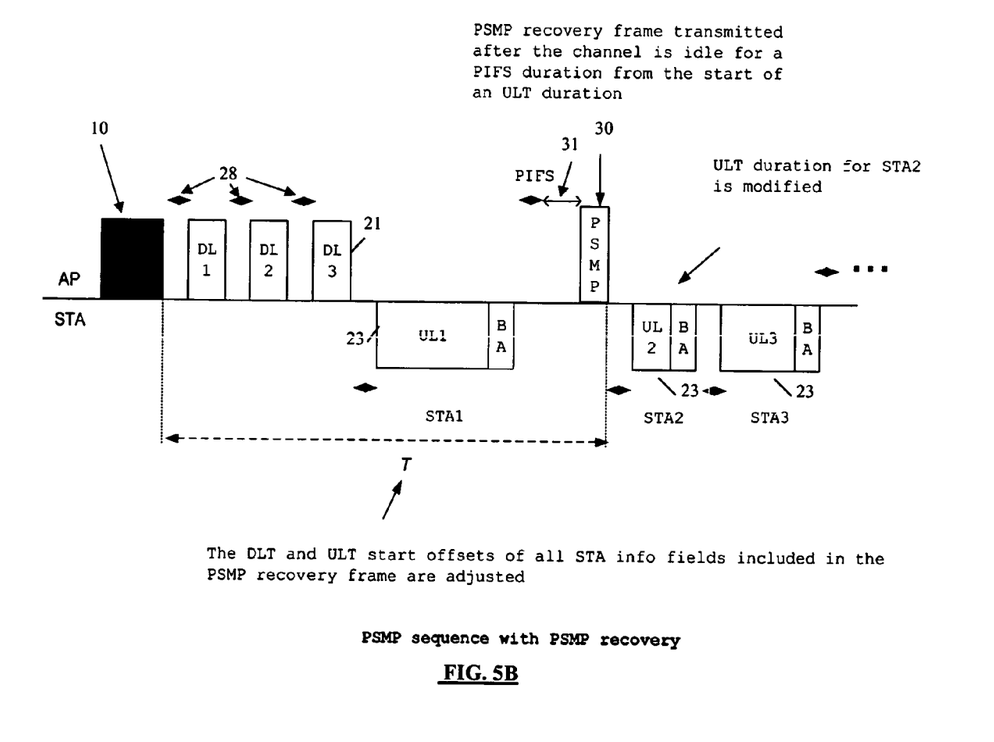

FIGS. 5A-B show another example comparison of: (1) data communication using a conventional PSMP sequence (FIG. 5A), and (2) data communication using a PSMP sequence that implements a PSMP recovery scheme according to the present invention (FIG. 5B), respectively. In both PSMP sequences, only STA1 receives the PSMP frame 10. STA2 and STA3 do not receive the initially transmitted PSMP frame 10. As a result, in FIG. 5A, STA2 and STA3 remain awake for the entire PSMP sequence and do not transmit UL data during the PSMP sequence. Only STA1 transmits UL data during the PSMP sequence.

In the PSMP sequence in FIG. 5B, after transmitting the PSMP frame 10, the AP transmits a PSMP recovery frame 30 according to the process steps in FIG. 3. Specifically, the AP detects that the wireless communication channel is idle for a PIFS period 31 from the start of the scheduled UL transmission (ULT period) for STA2. The AP transmits the PSMP recovery frame 30 including a modified ULT period for STA2 and an unmodified ULT period for STA3. In comparison to the scenario presented in FIG. 4B, the PSMP recovery frame 30 in FIG. 5B includes STA info fields for STA2 and STA3 only.

The DLT and ULT start offsets or the STA info fields included in the PSMP recovery frame for all of the STAs are adjusted based on the time elapsed from the end of the PSMP frame 10 to the end of the PSMP recovery frame 30. For example, in FIG. 5B, the DLT and ULT start offsets for STA2 and STA3 are adjusted by the time period T as shown in FIG. 5B.

Upon receiving the PSMP recovery frame 30, STA2 transmits UL data in adjusted ULT period and STA3 transmits UL data in un-modified (or originally assigned) ULT period, based on their respective schedules in the PSMP recovery frame 30. The ULT period for STA2 is shortened by the PIFS plus PSMP recovery transmission duration.

Figure 6A:
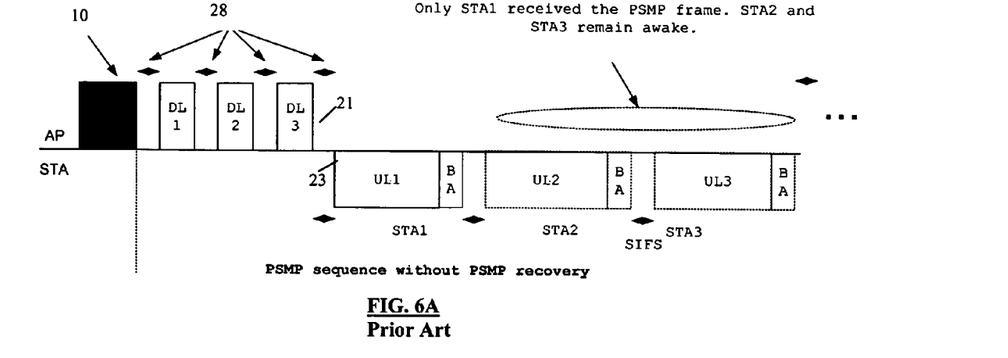
Figure 6B:
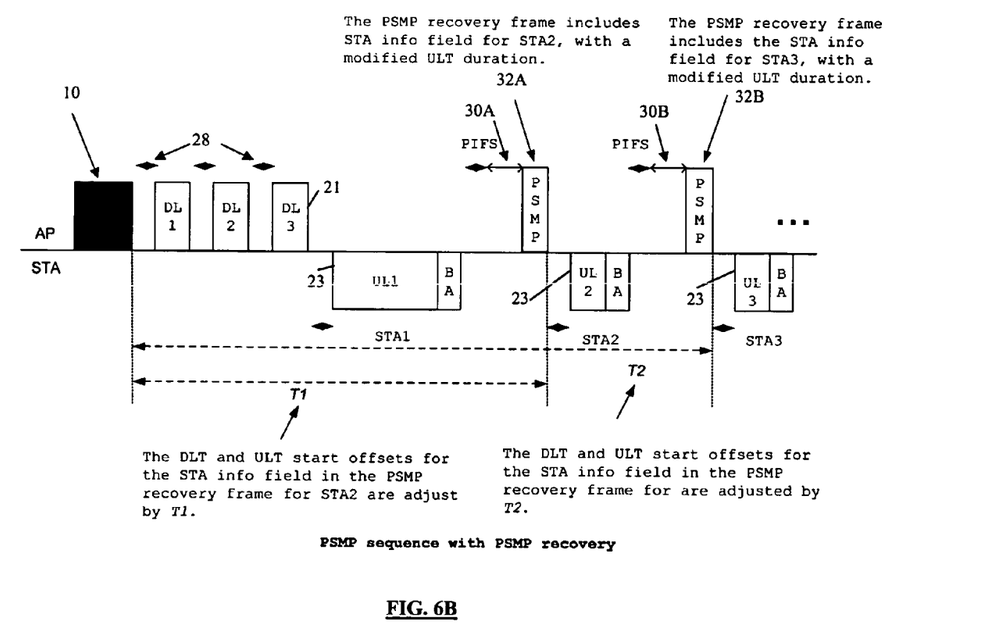

In some instances it is possible that the current ULT period is not long enough to include all STA info fields, or that transmission of the UL data of the STA scheduled in the current ULT period is highly time-sensitive. As such, other STA info fields cannot be included in the PSMP recovery frame 30. FIGS. 6A-B provides an example of such an instance.

Specifically, FIGS. 6A-B show another example comparison of: (1) data communication using a conventional PSMP sequence (FIG. 6A), and (2) data communication using a PSMP sequence that implements a PSMP recovery scheme according to the present invention (FIG. 6B), respectively. In both PSMP sequences, only STA1 receives a PSMP frame 10 transmitted by the AP. STA2 and STA3 do not receive the PSMP frame 10. As a result, in FIG. 6A, STA2 and STA3 remain awake during the PSMP sequence and do not perform UL transmissions. Only STA1 performs UL transmissions.

In FIG. 6B, after transmitting the PSMP frame 10, the AP detects that the channel is idle for a PIFS period 30A at the beginning of the scheduled UL transmission for STA2. The AP transmits a PSMP recovery frame 32A that includes an STA info field for the currently scheduled STA only. In the example of FIG. 6B, the AP transmits the PSMP recovery frame 32A including the STA info field for STA2 only, which includes modified ULT period details for STA2. Specifically, the ULT start offset field of the STA info in the PSMP recovery frame 32A for STA2 is adjusted by a time period T1, as shown in FIG. 6B.

Upon receiving the PSMP recovery frame 32A, STA2 transmits the UL data in a scheduled UL duration according to the PSMP recovery frame 32A. STA3 also receives the PSMP recovery frame 32A. However, the PSMP recovery frame 32A does not carry a STA info field for STA3. Hence, STA3 cannot determine its UL schedule from the PSMP recovery frame 32A and does not perform the UL transmissions.

The AP again detects that the channel is idle for a PIFS period 30B at the beginning of the scheduled UL transmission from STA3. This time the AP includes a STA info field in a PSMP recovery frame 32B for STA3 only, along with a modified ULT period for STA3. Specifically, the ULT start offset field of the STA info in the PSMP recovery frame 32B for STA3 is adjusted by a time period T2 as shown in FIG. 6B. The AP then transmits the PSMP recovery frame 32B over the wireless channel.

Upon receiving the PSMP recovery frame 32B, STA3 transmits UL data based on the scheduled ULT period in the PSMP recovery frame 32B. In comparison to the conventional example in FIG. 6A, in the example in FIG. 6B according to the present invention, STA2 and STA3 transmit UL data 23, and then conserve power by sleeping when UL transmissions are not scheduled for them by the PSMP recovery frames.

In some cases it is possible that a STA receives a PSMP frame from the AP, but has no data to transmit during the scheduled ULT period. In that case, the STA wakes up and determines that there is no data to transmit, then transmits a Null packet to the AP, and goes back to sleep for the whole ULT period. Alternatively, the STA may not wake up at all and remain asleep for the entire ULT period. Under the second case, the AP senses that the channel is idle for a PIFS period from the start of the ULT schedule for that STA. The AP interprets that the STA did not receive the original PSMP frame and transmits a PSMP recovery frame. Even though the AP mistakenly invokes the PSMP recovery scheme, this has some advantages, such as: (1) the channel remains busy, therefore, other STAs do not interpret the channel as idle to start their unscheduled transmissions which can cause collisions; and (2) including unmodified ULT (and/or DLT) schedules in the PSMP recovery frame for one or more STAs (which were originally scheduled after the STA scheduled in the current ULT period), enhances the robustness of the PSMP sequence.

Figure 7A:
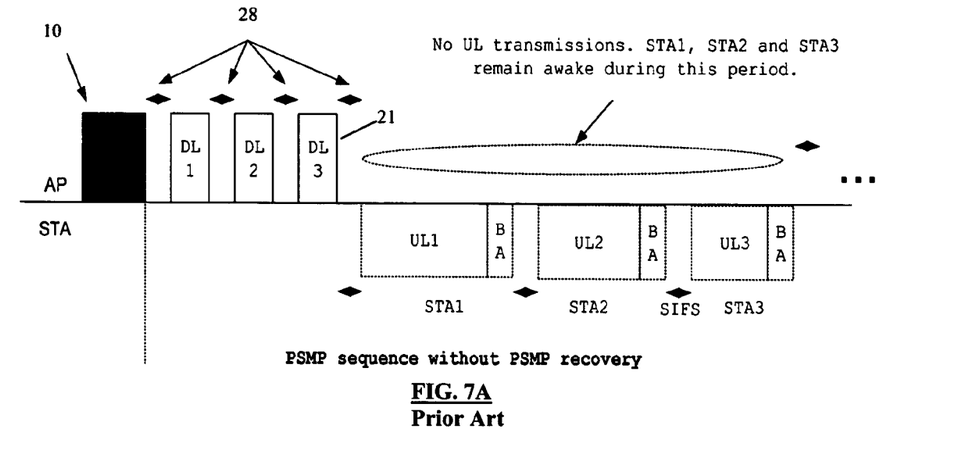
Figure 7B:
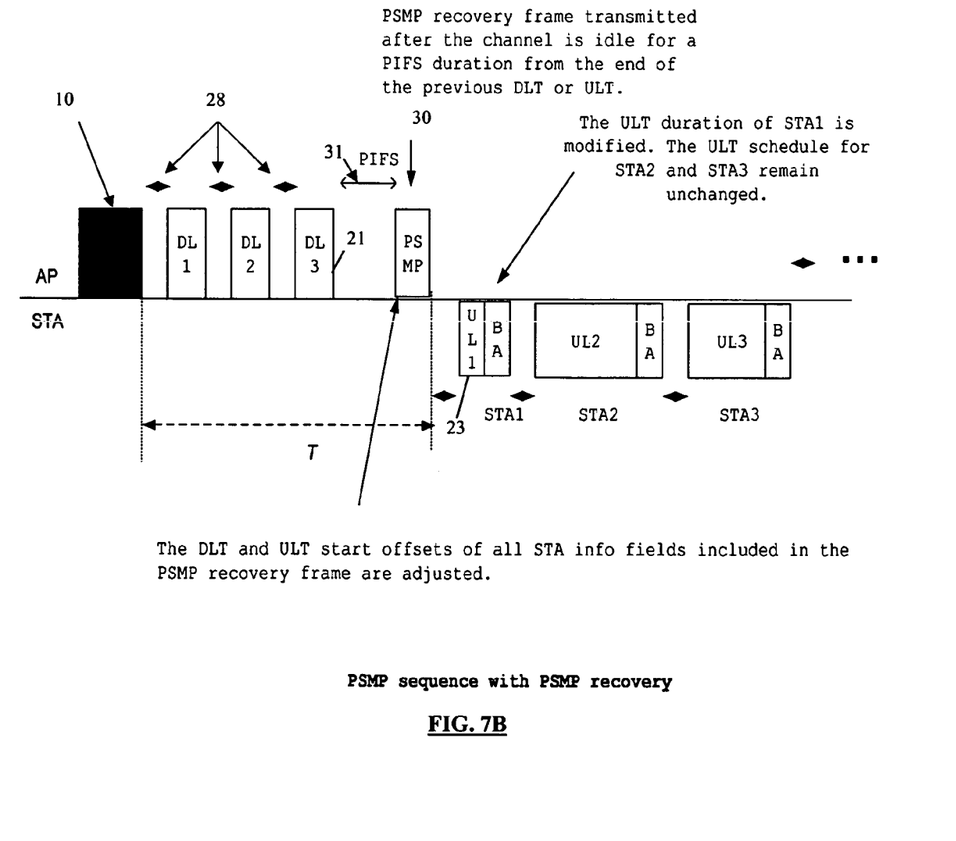

FIGS. 7A-B show examples of PSMP sequences similar to FIGS. 4A-D, respectively. However, in FIG. 7B, a PSMP recovery is invoked by transmission of a PSMP recovery 10 by the AP when the channel is idle for a PIFS period 31 from the end of the previous ULT or DLT period.

Figure 8:
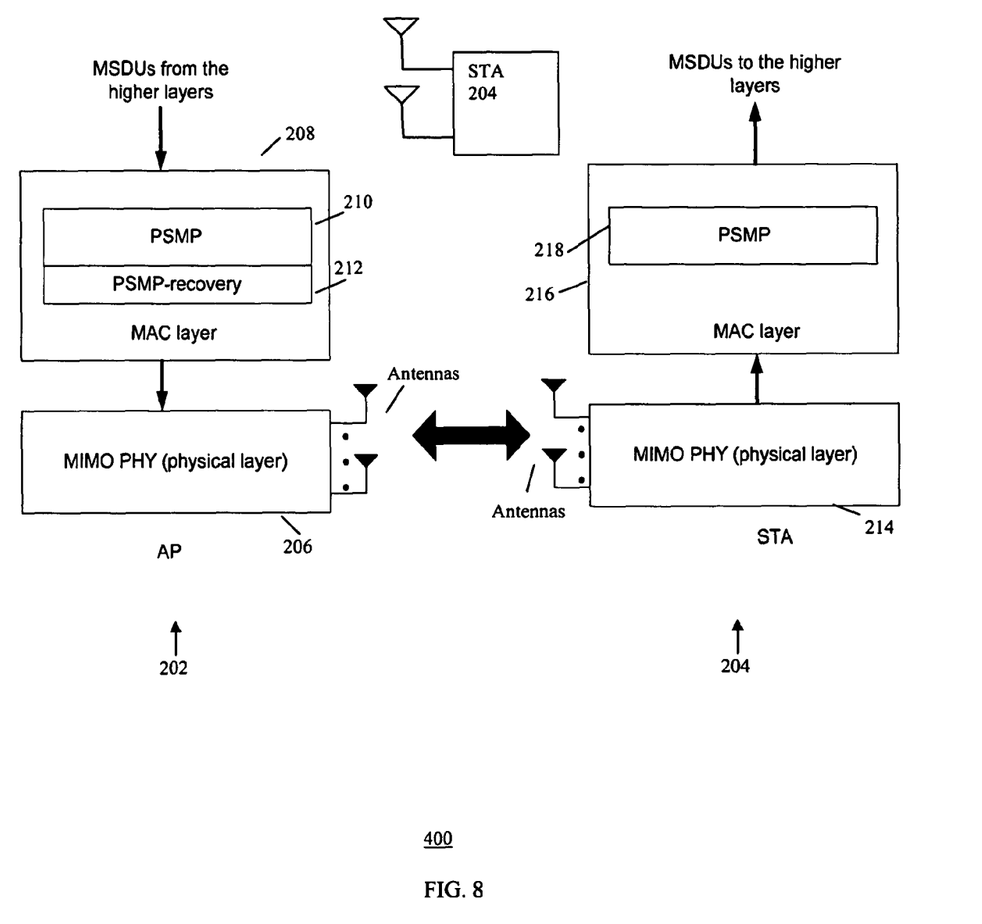
FIG. 8 shows a functional block diagram of a wireless communication system implementing a PSMP recovery mechanism, according to an embodiment of the present invention.

FIG. 8 shows a functional block diagram of a wireless communication system 200 implementing a PSMP recovery mechanism according to an embodiment of the present invention. The system 200 includes an AP 202 and multiple STAs 204.

The AP 202 comprises a physical (PHY) layer 206, and a media access control (MAC) layer 208. The PHY layer 206 implements a type of IEEE 802.11n communication standard (such as a MIMO PHY) for transmitting data over multiple antennas. The MAC layer 208 comprises a PSMP module 210 and a PSMP recovery function 212. Each STA 204 includes a PHY layer 214 corresponding to the PHY layer 206 of the AP 202. Each STA further includes a MAC layer 216 that comprises a PSMP module 218. The PSMP module 210 and the PSMP recovery function 212 in the AP implement an example of the PSMP recovery mechanism according to the present invention.

Although in the description of FIG. 8 the STAs and the AP have been shown separately, each is a type of wireless communication station capable of transmitting and/or receiving over a wireless channel in a wireless communication system such as a WLAN. Therefore, a wireless communication station herein can function as a transmitter, a receiver, an initiator and/or a responder. It then follows that an AP can function as a transmitter, a receiver, an initiator and/or a responder. Similarly, an STA can function as a transmitter, a receiver, an initiator and/or a responder.

Further, although the example embodiments described herein are based on a type of IEEE 802.11 protocol (e.g., IEEE 802.11n), the present invention is useful with other wireless systems utilizing frame transmissions between wireless devices that implement power saving schemes, as those skilled in the art will recognize. As such, the present invention is not limited to IEEE 802.11 protocols.

The present invention has been described in considerable detail with reference to certain embodiments thereof. However, other embodiments are possible. Therefore, the spirit and scope of the appended claims should not be limited to the description of the embodiments contained herein.

What is claimed is:

1. A method of Power Save Multi-Poll (PSMP) communication in a wireless communication system including a wireless Access Point (AP) and one or more wireless Stations (STA)s, comprising:
    transmitting a PSMP frame from the AP to the STAs over a wireless channel, wherein the PSMP frame includes one or more STA info fields which specify schedules of periods for communication over the wireless channel in a PSMP sequence;
    detecting if the channel is idle for a certain duration; and
    if the channel is idle for said certain duration, then performing a PSMP recovery process, wherein the PSMP recovery process comprises:
        constructing a PSMP recovery frame including a modified STA info field for a selected STA scheduled in a current uplink transmission (ULT) period;
    the AP taking control of the channel whenever the channel is idle for said certain duration in relation to a scheduled communication period specified in the PSMP frame; and
        broadcasting the PSMP recovery frame from the AP over the channel.

2. The method of claim 1, wherein said certain duration comprises a point coordination function interframe space (PIFS) period at the start of an uplink transmission (ULT) period.

3. The method of claim 1, wherein said certain duration comprises a point coordination function interframe space (PIFS) period at the end of a down link (DLT) period.

4. The method of claim 1, wherein said certain duration comprises a point coordination function interframe space (PIFS) period from the end of a previous.

5. The method of claim 1 wherein the PSMP recovery frame further includes one or more unmodified STA info fields corresponding to one or more other STAs with ULT periods originally scheduled later in the PSMP sequence than the current ULT period.

6. The method of claim 1 wherein the PSMP recovery process further comprises:
adjusting the starting offsets of the ULT and down link (DLT) periods in the STA info field for the selected STA in the PSMP recovery frame, relative to the duration of the PSMP recovery frame transmission.

7. The method of claim 1 further comprising:
receiving the PSMP recovery frame at the selected STA; and
the selected STA performing an ULT communication over the channel according to the ULT schedule in the PSMP recovery frame.

8. The method of claim 1 further comprising:
the selected STA following wake and sleep cycles according to the schedule for the selected STA in the PSMP recovery frame.

9. The method of claim 1 wherein constructing a PSMP recovery frame further includes determining the number of STA info fields to include in the PSMP recovery frame based on the time remaining in the current ULT period.

10. The method of claim 1 wherein constructing a PSMP recovery frame further includes determining the number of STA info fields to include in the PSMP recovery frame based on the time remaining after transmitting the PSMP recovery frame in the PSMP sequence.

11. The method of claim 1, further comprising:
an STA receiving the PSMP frame from the AP; and
if the STA has no data to transmit during the scheduled ULT period, then the STA transmitting a Null frame to the AP and going to a sleep cycle for the ULT period.

12. The method of claim 1 wherein performing a PSMP recovery process further includes:
determining if it is the beginning of a scheduled PSMP ULT period; and
if yes, then if the channel Idle duration is not less than a point coordination function interframe space (PIFS) period, then constructing the PSMP recovery frame and broadcasting the PSMP recovery frame.

13. The method of claim 12 wherein constructing the PSMP recovery frame further comprises:
reducing the current ULT and/or DLT period in the STA info field of the selected STA for the current ULT period, by the sum of the PIFS period and the PSMP recovery frame transmission duration.

14. The method of claim 13 wherein constructing the PSMP recovery frame further comprises:
adjusting the starting offsets of the ULT and DLT periods in the STA info field for the selected STA(s) in the PSMP recovery frame, relative to the duration of the PSMP recovery frame transmission, to compensate for time lapsed since transmission of the PSMP frame.

15. The method of claim 14 further comprising:
transmitting another PSMP recovery frame to convey the scheduled ULT and DLT periods to the STAs again.

16. The method of claim 15 further comprising:
those PSMP-enabled STAs indicated in the PSMP frame which did not receive the PSMP frame, successfully joining the PSMP sequence upon receiving the PSMP recovery frame.

17. The method of claim 16 further comprising:
all PSMP-enabled STAs starting to follow wake and sleep cycles according to schedules in the STA info fields of the PSMP recovery frame.

18. A wireless communication system comprising:
a wireless communication station and one or more Power Save Multi-Poll (PSMP)-enabled wireless stations, configured to communicate via a wireless channel;
the wireless communication station including:
a PSMP module that is configured to transmit a PSMP frame over the channel; and
a PSMP recovery function that is configured such that upon detecting that the channel is idle for a certain duration, then the PSMP recovery function performs a PSMP recovery process, wherein the PSMP recovery function is further configured for constructing a PSMP recovery frame including a modified Station (STA) info field for a STA scheduled in a current uplink transmission (ULT) period;
taking control of the channel whenever the channel is idle for said certain duration in relation to a scheduled communication period specified in the PSMP frame; and
broadcasting the PSMP recovery frame over the channel; and
wherein the PSMP frame includes one or more STA info fields which specify schedules of periods for communication over the wireless channel in a PSMP sequence.

19. The system of claim 18, wherein said certain duration comprises a point coordination function interframe space (PIFS) period at the start of an uplink transmission (ULT) period.

20. The system of claim 18, wherein said certain duration comprises a point coordination function interframe space (PIFS) period at the end of a downlink transmission (DLT) period.

21. The system of claim 18, wherein the communication system stations implements a type of wireless local area network (WLAN).

22. The system of claim 18 wherein the PSMP recovery frame further includes one or more unmodified STA info fields corresponding to one or more other STAs with ULT periods originally scheduled later in the PSMP sequence than the current ULT period.

23. The system of claim 18 wherein the PSMP recovery function is further configured to:
adjust the starting offsets of the ULT and downlink transmission (DLT) periods in the STA info field for said STA in the PSMP recovery frame, relative to the duration of the PSMP recovery frame transmission, to compensate for time lapsed since transmission of the PSMP frame.

24. The system of claim 18 wherein:
at least one of the PSMP-enabled STAs is configured to perform ULT communication over the channel according to a ULT schedule in the PSMP recovery frame.

25. The system of claim 18 wherein:
at least one of the PSMP-enabled STAs is configured to follow wake and sleep cycles according to a corresponding schedule in the PSMP recovery frame.

26. The system of claim 18 wherein the PSMP recovery function is further configured to determine the number of STA info fields to include in the PSMP recovery frame based on the time remaining in the current ULT period.

27. The system of claim 18 wherein the PSMP recovery function is further configured to determine the number of STA info fields to include in the PSMP recovery frame based on the time remaining for transmitting in the PSMP recovery frame in the PSMP sequence.

28. The system of claim 18 wherein the communication system implements a type of IEEE 802.11n communication protocol.

29. The system of claim 18 wherein the PSMP recovery function is further configured to:
determine if it is the beginning of a scheduled PSMP ULT period; and if yes, then if the channel idle duration is not less than a point coordination function interframe space (PIFS) period, then construct and broadcast the PSMP recovery frame.

30. The system of claim 29 wherein the PSMP recovery function is further configured to reduce the current ULT and/or downlink transmission (DLT) period in the STA info field of a STA for a current ULT period, by the sum of the PIFS period and the PSMP recovery frame transmission duration.

31. The system of claim 30 wherein the PSMP recovery function is further configured to adjust the starting offsets of the ULT and DLT periods in the STA info field for the said STA, relative to the duration of the PSMP recovery frame transmission, to compensate for time lapsed since transmission of the PSMP frame.

32. The system of claim 31 wherein the PSMP recovery function is further configured to transmit another PSMP recovery frame to convey the scheduled ULT and DLT periods to the STAs again.

33. The system of claim 32 wherein:
the STAs are configured such that if each did not receive the PSMP frame, the STA successfully joins the PSMP sequence upon receiving the PSMP recovery frame.

34. The system of claim 33 wherein the STAs are configured such that each STA starts following wake and sleep cycles according to schedules in a corresponding STA info field in the PSMP recovery frame.

35. The system of claim 18 wherein the wireless communication station comprises an AP.

36. A wireless communication station for communication over a wireless channel, comprising:
a Power Save Multi-Poll (PSMP) module that is configured to transmit a PSMP frame over the channel to one or more PSMP-enabled wireless Stations (STAs);
a PSMP recovery function that is configured such that upon detecting that the channel is idle for a certain duration, then the PSMP recovery function performs a PSMP recovery process, wherein the PSMP recovery function is further configured for
constructing a PSMP recovery frame including a modified STA info field for an STA scheduled in a current uplink transmission (ULT) period;
taking control of the channel whenever the channel is idle for said certain duration in relation to a scheduled communication period specified in the PSMP frame; and
broadcasting the PSMP recovery frame over the channel; and
wherein the PSMP frame includes one or more STA info fields which specify schedules of periods for communication over the wireless channel in a PSMP sequence.

37. The wireless communication station of claim 36, wherein said certain duration comprises a point coordination function interframe space (PIFS) period at the start of an ULT period.

38. The wireless communication station of claim 36, wherein said certain duration comprises a PIFS period from the end of a previous uplink or downlink transmission period.

39. The wireless communication station of claim 36 wherein the PSMP recovery frame further includes one or more unmodified STA info fields corresponding to one or more other STAs with ULT periods originally scheduled later in the PSMP sequence than the current ULT period.

40. The wireless communication station of claim 36 wherein the PSMP recovery function is further configured to: adjust the starting offsets of the ULT and downlink transmission (DLT) periods in the STA info field for said STA in the PSMP recovery frame, relative to the duration of the PSMP recovery frame transmission, to compensate for time lapsed since transmission of the PSMP frame.

41. The wireless communication station of claim 36 wherein the PSMP recovery function is further configured to determine the number of STA info fields to include in the PSMP recovery frame based on the time remaining in the current ULT period.

42. The wireless communication station of claim 36 wherein the PSMP recovery function is further configured to determine the number of STA info fields to include in the PSMP recovery frame based on the time remaining for transmitting in the PSMP recovery frame in the PSMP sequence.

43. The wireless communication station of claim 36 wherein the wireless communication station implements a type of IEEE 802.11n communication protocol.

44. The wireless communication station of claim 36 wherein the PSMP recovery function is further configured to:
determine if it is the beginning of a scheduled PSMP ULT period; and
if yes, then if the channel idle duration is not less than a point coordination function interframe space (PIFS) period, then construct and broadcast the PSMP recovery frame.

45. The wireless communication station of claim 44 wherein the PSMP recovery function is further configured to reduce the current ULT and/or downlink transmission (DLT) period in the STA info field of a STA for a current ULT period, by the sum of the PIFS period and the PSMP recovery frame transmission duration.

46. The wireless communication station of claim 45 wherein the PSMP recovery function is further configured to adjust the starting offsets of the ULT and DLT periods in the STA info field for said STA, relative to the duration of the PSMP recovery frame transmission, to compensate for time lapsed since transmission of the PSMP frame.

47. The wireless communication station of claim 46 wherein the PSMP recovery function is further configured to transmit another PSMP recovery frame to convey the scheduled ULT and DLT periods to the STAs again.

48. The wireless communication station of claim 36 wherein is further configured such that if a STA with a scheduled uplink transmission (ULT) in the PSMP frame receives the PSMP frame but has no data to transmit during the scheduled ULT period, the PSMP recovery function upon detecting that the channel is idle for a certain duration, performs a PSMP recovery function.

49. A wireless communication station for communication over a wireless channel, comprising:
a Power Save Multi-Poll (PSMP) module that is configured for transmitting a PSMP frame over the channel to one or more PSMP-enabled wireless Stations (STAs);
a PSMP recovery function that is configured such that upon detecting that the channel is idle for a certain duration, then the PSMP recovery function performs a PSMP recovery process by constructing a PSMP recovery frame including a modified STA info field,
wherein the PSMP frame includes one or more STA info fields which specify schedules of periods for communication over the wireless channel in a PSMP sequence, and the number of STA info fields to include in the PSMP recovery frame is based on one of: an amount of time remaining in a current ULT period and an amount of time remaining after transmitting the PSMP recovery frame in the PSMP sequence.

* * * * *